United States Patent [19]

Schoeneweis et al.

[11] 4,072,161
[45] Feb. 7, 1978

[54] SEALING MEMBER FOR VALVE STEMS

[75] Inventors: E. Frederick Schoeneweis, Coraopolis; Leonard J. Stephens, Pittsburgh, both of Pa.

[73] Assignee: Rockwell International Corporation, Pittsburgh, Pa.

[21] Appl. No.: 714,460

[22] Filed: Aug. 16, 1976

Related U.S. Application Data

[63] Continuation of Ser. No. 614,207, Sept. 17, 1975, abandoned.

[51] Int. Cl.² ............................................. F16K 5/00
[52] U.S. Cl. .................................. 137/68 R; 251/315; 251/DIG. 1; 137/860
[58] Field of Search ................................. 251/304–317, 251/214, DIG. 1; 137/68 R, 516.15, 860

[56] References Cited

U.S. PATENT DOCUMENTS

| | | | |
|---|---|---|---|
| 1,202,003 | 10/1916 | Tobin | 251/312 |
| 1,483,001 | 2/1924 | Kurre | 251/309 |
| 1,741,983 | 12/1929 | Ellberg et al. | 251/312 |
| 2,787,400 | 4/1957 | Fritsch | 137/860 |
| 2,980,390 | 4/1961 | Anderson et al. | 251/312 |
| 3,228,652 | 1/1966 | Antrim | 137/860 |
| 3,542,336 | 11/1970 | Giese | 251/309 |
| 3,701,362 | 10/1972 | Reese | 251/308 |
| 3,782,685 | 1/1974 | Gallagher et al. | 251/306 |
| 3,895,632 | 7/1975 | Plowiecki | 251/309 |
| 3,971,402 | 7/1976 | Gallo | 251/309 |

FOREIGN PATENT DOCUMENTS

| | | | |
|---|---|---|---|
| 1,363,369 | 5/1963 | France | 251/310 |
| 1,105,612 | 5/1954 | France | 251/312 |
| 1,386,873 | 3/1964 | France | 251/312 |

Primary Examiner—Martin P. Schwadron
Assistant Examiner—H. Jay Spiegel

[57] ABSTRACT

An all-plastic valve having a unitary body has a cap assembly for excluding external contaminants from the interior of the valve while allowing venting of excess pressure from the interior.

1 Claim, 7 Drawing Figures

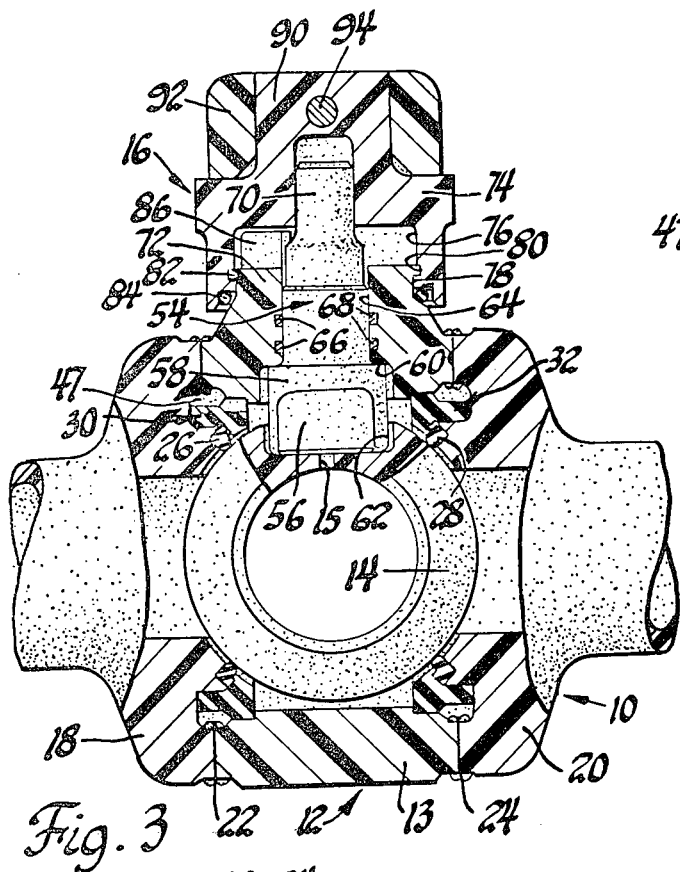
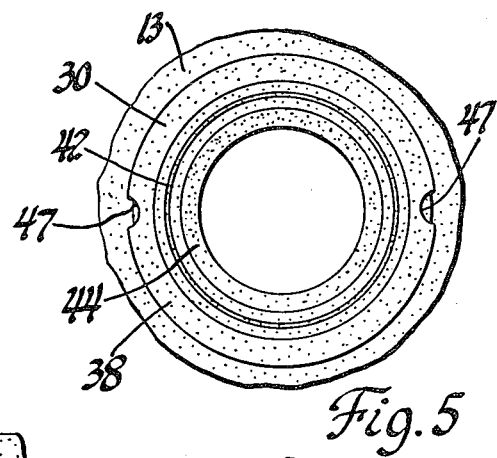
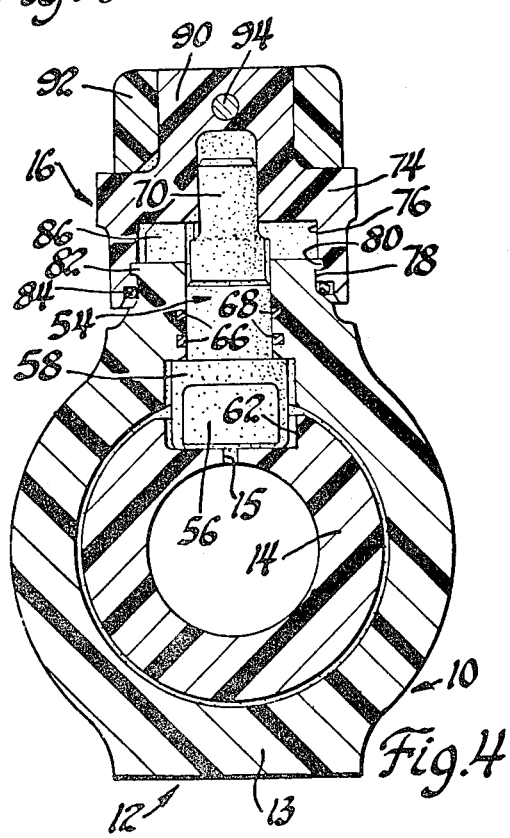
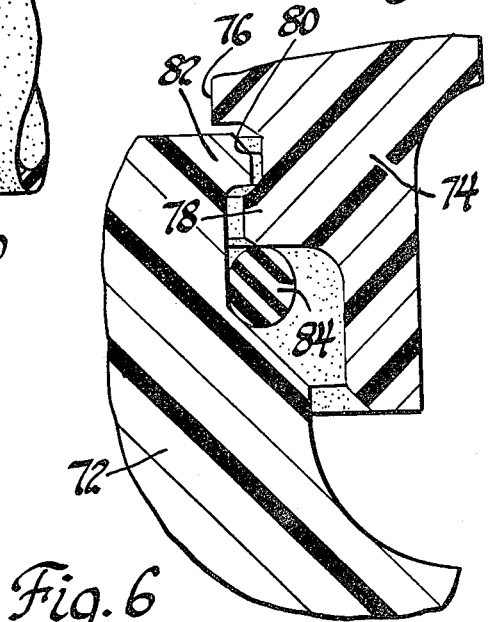
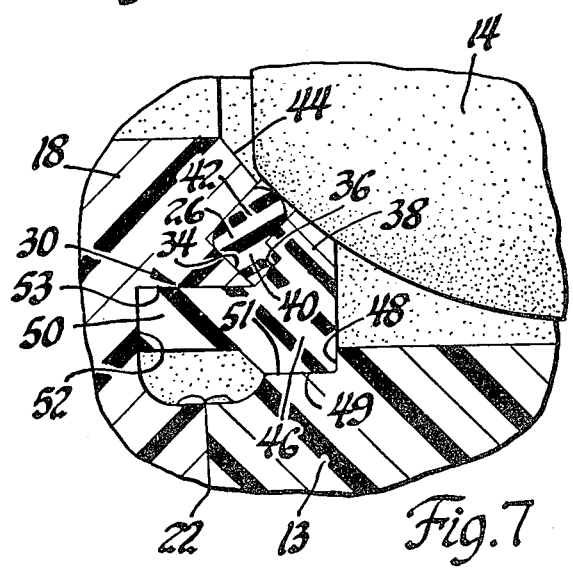

SEALING MEMBER FOR VALVE STEMS

This is a continuation of application Ser. No. 614,207, filed Sept. 17, 1975 now abandoned.

BACKGROUND OF THE INVENTION

This invention relates to plastic ball valves for gas distribution lines, particularly for use with plastic pipe.

Valves for gas distribution lines previously have been made in many types with iron or steel valve bodies and with end connections for attachment to iron or steel pipe by threaded, flanged or welded joints. Valves used in buried service have been of rugged design to resist the hostile underground environment. While pressures in distribution service are low as compared to those encountered in transmission line valves and in valves in many other applications, distribution valves have traditionally been over-designed (from a pressure safety standpoint) to assure the dimensional stability needed for tight shutoff and resistance to pipe loads. While typical valves are operated infrequently, they require the highest order of reliability—they must be operable even in cases where years may pass between operational cycles.

The rapid growth in the use of plastic pipe, particularly polyethylene, in the last decade has had certain drawbacks on valve installations. First, costly adapters are necessary to accommodate transitions between polyethylene pipe and metal valves. Second, the metal valves and adapters compromise the plastic pipe system by leaving metal gas-containing components in the ground, with attendant questions and costs associated with corrosion protection and record keeping. Third, the effects of valve operating torque on plastic pipe require special consideration. These complications affect the life cycle cost of valve installations adversely and compromise some of the cost savings in using polyethylene pipe instead of steel pipe.

The capability of closing off a polyethylene pipe with pinch devices was recognized as a partial compensation for the increased cost of installing valves, but this expedient was considered by many as only an interim compromise. Utilities using polyethylene pipe indicated a real need for non-metallic valves compatible with the principal grades of pipe in common use.

SUMMARY OF THE INVENTION

The present invention is directed to a novel valve which is impervious to most materials, is sealed against entry of foreign material, and is particularly designed to be used with the plastic pipe being used in today's natural gas distribution lines. The novel method of assembly and the resulting article are an economical and efficient answer to a need in this type of natural gas service, the article being adapted for underground installation.

It is an object of the present invention to provide a valve having a long, safe maintenance-free service life in buried gas distribution lines.

It is a further object to provide a non-metallic valve with assured seat, body, and stem seal tightness over a long service life.

It is still a further object to provide a rugged valve able to safely withstand abuse from excessive stem torque, from accidental dropping of objects such as turning wrenches on the valve and from the effects of backfilling and subsequent soil loading.

It is another object to provide a valve with low operating torque to minimize stress on the connecting polyethylene pipe when the valve is operated.

It is a most important object to provide an economical, non-metallic valve suitable for connection to polyethylene pipe by presently accepted methods of connection.

It is another important object to provide a non-metallic valve having pressure ratings and long-term pressure integrity consistent with existing standards applicable to polyethylene pipe and fittings.

BRIEF DESCRIPTION OF THE DRAWINGS

FIG. 3 is similar to FIG. 2, but with the valve in the closed position, with vent 47 again being shown on the top left-hand seat retainer;

FIG. 4 is a vertical section along the line 4—4 of FIG. 2;

FIG. 5 is a section along the line 5—5 of FIG. 2, with the ball removed to show the seat and seat retainer and the vents of the seat retainer;

FIG. 6 is an enlarged sectional detail of the cap mounting and O-ring seal to allow venting of the stem area; and FIG. 7 is a sectional detail of the seal ring mounting.

DETAILED DESCRIPTION OF A PREFERRED EMBODIMENT

Figure 1:
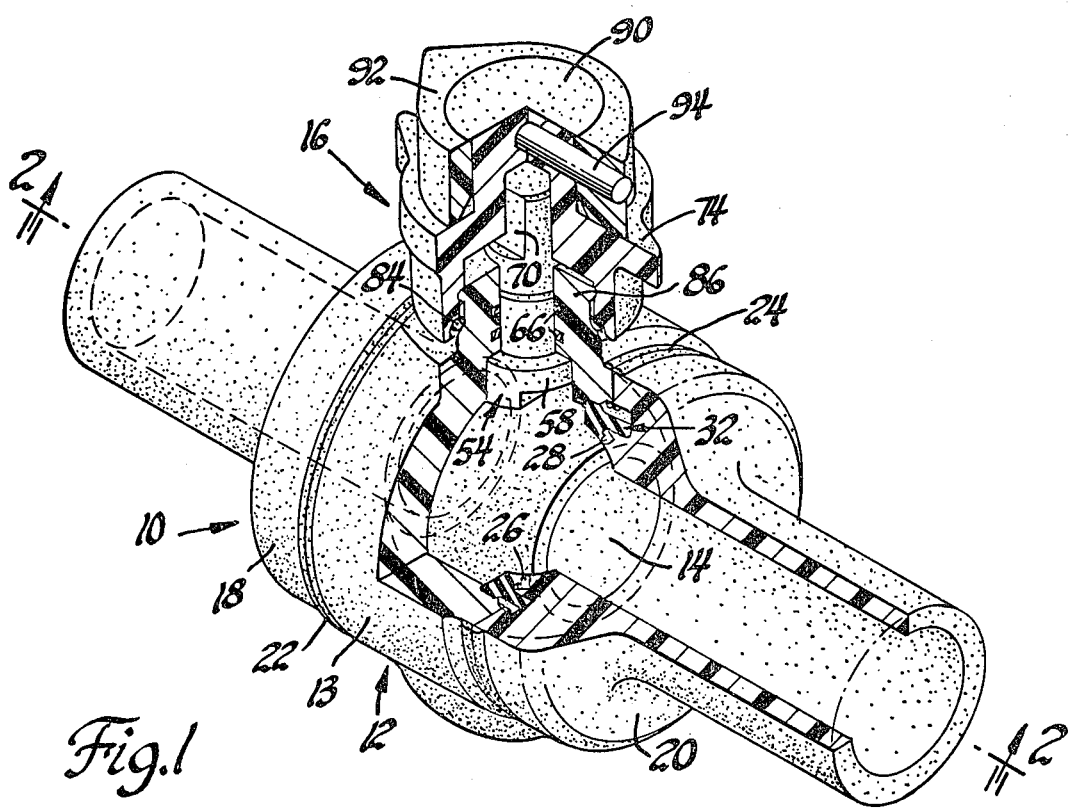
FIG. 1 is an elevation view of the valve of the present invention, with a portion of the valve body shown in section and the ball omitted to illustrate the inner construction.
Figure 2:
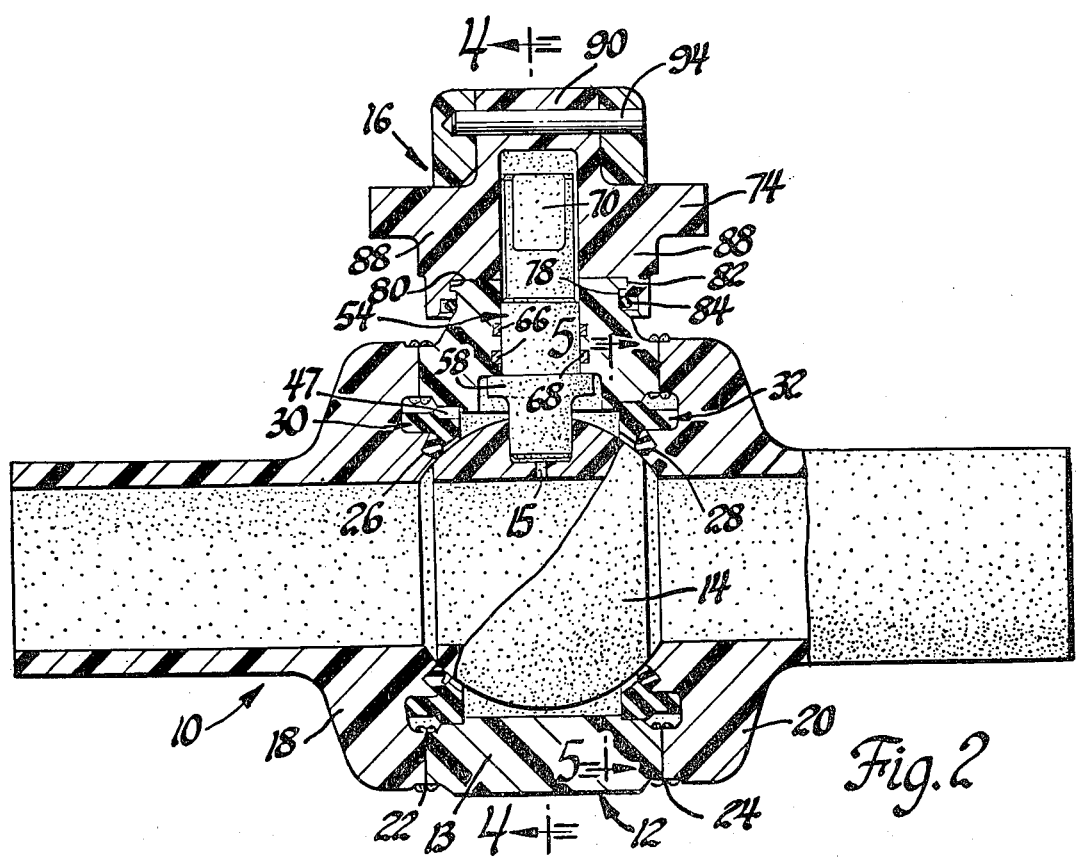
FIG. 2 is a side view mainly along the line 2—2 of FIG. 1 with the valve shown in section, and a portion of the ball also shown in section, with the valve in the open position, and one vent 47 shown on the top of the left-hand seat retainer, rotated 90° to illustrate the construction.

The valve assembly 10 as best seen in FIGS. 1 and 2, has a valve body 12 including three external body portions, a main body 13, and two end sections 18 and 20. These elements are made of polyethylene for compatibility with the line pipe and its inert qualities with respect to the surroundings in which it is used. The main body 13 encircles a polypropylene ball 14 and holds a stem assembly 16. The stem 54 is of a plastic such as DuPont's "Delrin" which displays little swell under high moisture conditions and has no porosity problems such as sometimes exist with glass-filled materials. End sections 18 and 20 are identical (except perhaps where different ends are required for connection to the plastic pipe line) and are joined to the main body 13 at joints 22 and 24, respectively. The joints 22 and 24 are a butt fusion type, and are accomplished by techniques hereinafter described. The outer ends of end sections 18 and 20 are made to suit any of several joining methods and each end may be separately adapted to varying connecting requirements.

Inside the valve, seats 26 and 28 are positioned in recesses in end sections 18 and 20. The seats 26 and 28 are retained in position by polypropylene seat retainers 30 and 32, respectively. The recesses in the end sections, the seats, and the seat retainers are similar on either end and one cross-sectional view, shown in FIG. 7 best illustrates their construction. Accordingly, only one seat assembly will be completely described here. A recess 34 is cut into the inner face of body end 18 and accommodates L-shaped seat 26 which is preferably made of a rubber compound such as Buna-N. Buna-N was selected because it has given excellent service in prior valves and meters in natural gas service, having a good resistance to the swelling effects of the odorants and deicers that are used in distribution lines. Seat retainer 30 is shaped with a recess 36 behind face 38 to receive leg 40 of seat 26 to retain the seat in place, resisting the forces produced by differential pressure during operation of the valve. Leg 42 of seat 26 protrudes a predetermined distance beyond the face 38 of retainer 30 and face 44 of body end 18 into contact with ball 14.

Seat retainer 30 has a body portion 46 which abuts a face 48 of main body 13 and a leg 50 which abuts a face 52 of end 18 when the parts are placed in assembled position. Body portion 46 has vents 47, seen in FIG. 5, that are preferably positioned 180° apart. These vents 47 are for balancing the pressures behind the seat retainers 30 and 32 with the pressure in the valve main body 12, and also behind valve seats 26 and 28. This minimizes the unbalanced forces on the seats 26 and 28 during valve operation. These parts and their abutting surfaces are dimensioned such that the aforesaid abutments then produce the desired preload on valve seat 26, in its contact with ball 14. The seat retainer acts both to retain the rubber seat 26 in place and to positively position end 18 with respect to main body 13. The abutment of body portion 46 with face 48 of main body 13 positions end section 18 axially along the flow path with respect to main body 13 during the joining process, while a cylindrical surface 49 of retainer 30 is closely but slidingly received by cylindrical surface 51 of main body 13 to position retainer 30 radially. End section 18 is in turn, positioned axially by the abutment of face 52 with leg 50 of the seat retainer, and is positioned radially by the fit of surface 53 engaging the inside surface of leg 50. As mentioned above seat 28 and retainer 32 are identically constructed, but installed in a mirror image configuration, to the preceding description of seat 26 and retainer 30.

Polypropylene ball 14 is "floated" on the seats 26 and 28. If excessive pressure on the ball (while it is in the closed position) displaces it axially, the seat on the loaded side is compressed into its space between the associated end and its accompanying seat retainer. As seen in FIG. 7 for seat 26, if ball 14 is moved to the left, leg 42 of seat 26 is compressed into the space between end 18 and seat retainer 30 until the ball contacts face 44 of end 18. The material of end 18 is harder than the seat and serves to limit the movement of ball 14 and the loading on seat 26. Additionally, vent 15 formed in the upper portion of the ball 14 adjacent to the stem assembly 16 establishes communication between the flow channel and the space between ball 14 and body 13. Thus, when the ball 14 is in the fully opened or fully closed position, the pressure on both sides of the ball 14 will be balanced. The actuator means for the ball, the valve stem 54, as seen in FIG. 2, 3, and 4, is inserted in the main body 13 before placement of the ball 14 in the housing. When the ball 14 is placed in the housing it serves to retain the valve stem 54 in place. The stem 54 has a non-circular portion 56 which engages the ball 14 and a shoulder 58 which engages the bottom of a counterbore 60 in the main body. The non-circular portion 56 of stem 54 projects into a recess 62 in the ball. The upward movement of stem 54 is limited by engagement of shoulder 58 with counterbore 60, so the stem 54 and ball 14 are always engaged for turning movement. Stem 54 is journalled for rotation in bore 64 of the main body, and is sealed by suitable packing 66, such as "quad" rings or O-rings set into recesses 68 of bore 64.

The end 70 of valve stem 54 which projects above the top of boss 72 on main body 13 is molded with non-circular portions for transmitting torque to the ball 14. Over this protruding end 70 is fitted a cap 74. This cap 74 has a large bore 76 which fits part-way down over boss 72. In bore 76 is an internal annular projection 78 and a recess 80 which are dimensioned to snap down over a lip 82 on the upper end of boss 72. The lip 82 is larger in outside diameter than projection 78, but is received freely in recess 80. The lip 82 is preferably not continuous but has one or more gaps such as 83 in FIG. 6 to prevent formation of a pressure seal due to contact between projection 78 and lip 82. The material of the cap allows slight deformation during assembly and recovery after projection 78 is pushed down over lip 82, thus, snapping cap 74 into place on boss 72 and effectively surrounding the valve stem opening 64. To guard against entry of contaminants from outside, the open end of cap 74 is formed with a counterbore to receive an O-ring 84. The O-ring 84 is mounted on a sloping exterior surface of boss 72. This slope is designed to urge O-ring 84 into engagement with the bottom of projection 78 on cap 74, and thus normally seals the slight clearance between projection 78 and 72. In the event of leakage from the interior of the valve around the stem, the O-ring 84 can move away from the clearance, relieving any pressure differential, and then return to its sealing position.

Atop boss 72 are formed stop members 86, which cooperate with stops 88 on the under side of cat 74 to limit the turning of the valve stem to the customary quarter turn between fully open and tightly closed positions.

One of the boss stop members 86 is seen on FIG. 3 and 4, while the stops 88 on cap 74 are seen in cross-section in FIG. 2.

The exterior of cap 74 has a reduced circular section 90 to accommodate a wrench adapter 92, which snugly fits the cap and is exteriorly shaped to fit a valve wrench (not shown). Between the cap 74 and wrench adapter 92 is a shear pin coupling 94. This shear pin is designed to sever upon the application of excessive torques to the stem. This safety feature prevents damage to the interior of the valve (stem, seats, ball, stops, or the like).

The assembly of the parts of this valve contains some known steps, and some unique to this invention. The stem seals 66 are first placed in their recesses 68 in the stem portion of main body 13, after which stem 54 is inserted up through the bore 64 from inside the valve main body portion 13. A selected first body end, with its respective valve seat and seat retainer in place is then brought adjacent the main body portion. An annular plate-like heater is placed between the main body portion and the body end. The heater is sized to contact only the areas to be fused together. The body end piece and the main body portion are moved into light pressure contact with the heater. This contact is maintained for a sufficient period of time to properly heat the fusion joints. This time period will vary depending upon the material to be fused, the temperature of the heater and the thickness of the joint, but is typically on the order of 30 seconds to 2 minutes.

After bringing the fusion joints up to the desired temperature, the body end and the main body portion are moved slightly apart to allow the removal of the heater and are then promptly pushed together until the retainer contacts face 48 on main body 13. This abutment determines the relative positions of the various internal parts of the valve. In the manufacture of the parts of the exterior of the valve, i.e., main body portion 13 and ends 18 and 20, the abutting ends are deliberately made slightly long, to guarantee a complete surface fusion completely around the valve. Following fusion of the main body portion to the first body end the ball 14 is then slid in over the non-circular lower end 56 of stem 54. This sub-assembly of stem and ball may then be rotated 90° to retain the ball in the main body portion during subsequent steps. The second body end is then brought adjacent to the assembled first body end and center portion, and the heating and fusion processes described above are repeated to provide a unitary assembly. It is to be understood that the body ends may be attached to the main body simultaneously but the sequential assembly is preferred. It is also to be understood that only one end may be molded separately, the other end being molded integrally with the main body 13.

After allowing the joints to cool, the cover 74 over the exterior end 70 of valve stem 54 is installed. First O-ring 84 is placed over the boss 72 which journals stem 54. This O-ring is moved down the boss sufficiently to be out of the way of internal annulus 78 in cap 74. The cap is then placed on the stem and pushed down until annulus 78 snaps down over lip 82 on boss 72. This seats lip 82 in recess 80 in the cap and retains the cap on the valve stem. O-ring 84 is then allowed to seat against annulus 78.

At some point in the assembly, either before or after installation of cover 74, wrench adapter 92 is fixed on cover 74 and a through hole is drilled and pin 94 is fixed therein. This limits the torque applied to cover 74 to the shear strength of the pin 94.

From the foregoing description, it will be seen that a novel combination of materials particularly suited to natural gas service has been assembled in a novel manner to produce a dependable long-lived economical valve particularly designed for use with plastic pipe.

What is claimed is:

1. A valve assembly comprising:
   a valve body having a flow passage for conveying a fluid therethrough;
   a valving element in said valve body rotatable about a valve axis between first and second positions for opening and closing said flow passage;
   an annular boss on said valve body having a frusto-conical outer surface which terminates at an extended portion of said boss and a central opening therethrough;
   a valve stem operatively connected to said valving element and extending through said opening to terminate at an extended end thereof outwardly of said valve body, said stem and a wall of said opening defining a potential leakage path therebetween;
   a cap mounted on said extended end of said stem to be capable of transmitting rotational force thereto, said cap including an inwardly extending circumferential lip which overlies an outwardly extending collar on a terminal end of said extended portion of said boss to retain said cap thereon, said cap being capable of rotation relative to said boss;
   said lip including an exterior surface thereon to define with said frusto-conical surface of said boss a converging space therebetween, said space being in fluid communication with said leakage path through a gap between said lip and said collar;
   an O-ring being located within said space and in sealing engagement with said exterior surface and said frusto-conical surface to prevent ingress to said leakage path of contaminant fluids or particles while allowing venting of said fluid at a predetermined pressure if said fluid escapes from said valve body through said leakage path;
   a cylindrical sleeve extending from said lip adjacent said frusto-conical surface to define a predetermined distance therebetween to retain said O-ring within said space throughout operation of said valve assembly;
   a valve operating fitting including means for mounting said fitting on said cap, such fitting having surfaces thereon capable of receiving a tool for applying a torque through said fitting to said cap for rotation of said valving element; and
   said means for mounting said fitting including a shearable portion thereof capable of shearing when a predetermined torque is applied to said fitting to prevent damage to said valve assembly.

* * * * *